Patented Aug. 10, 1943

2,326,555

UNITED STATES PATENT OFFICE 2,326,555

VULCANIZATION OF RUBBER

Arthur M. Neal, Wilmington, Del., and Bernard M. Sturgis, Pitman, N. J., assignors to E. I. du Pont de Nemours & Company, Wilmington, Del., a corporation of Delaware No Drawing. Application November 14, 1940, Serial No. 365,608

22 Claims. (Cl. 260—785)

This invention relates to the acceleration of the vulcanization of rubber and more particularly to the use of 2-mercapto-thiazoline for such purpose in conjunction with certain compounds as activators therefor.

2-mercapto-thiazoline and some of its derivatives have been proposed as accelerators for the vulcanization of rubber. However, such mercapto-thiazolines were found to be very weak and ineffective accelerators so that they have not been employed commercially until the present time. 2-mercapto-thiazoline and its homologues are acidic compounds. This is shown by the fact that they are readily soluble in cold dilute solutions of caustic alkalies and may be precipitated unchanged from these solutions by the addition of acid. They also readily form salts with amines and other basic substances and, in general, exhibit the reactions of acidic compounds.

It is known that the cures, obtainable by many basic and neutral organic accelerators, such as metaphenylene diamine and urea, can be improved by the addition of small amounts of various organic acids which activate such accelerators. This is particularly shown in Patent 1,467,197 to W. F. Russell. It is also well known that acidic accelerators of vulcanization, such as 2-mercapto-benzothiazole, behave in an entirely different manner. Morton, in Patent 1,929,561, discloses that aromatic carboxylic acids retard rather than activate such acidic accelerators. Thies, in Patent 2,058,840, and Cadwell, in Patent 1,871,037, disclose that aliphatic carboxylic acids retard, rather than activate, acidic accelerators, such as 2-mercapto-benzothiazole. It would, therefore, be expected that, the organic carboxylic acids would also retard, rather than activate, the 2-mercapto-thiazoline accelerators.

It is an object of the present invention to provide a new and improved method of vulcanizing rubber to obtain vulcanized rubber of improved properties. Another object is to convert 2-mercapto-thiazolines from relatively weak accelerators of no commercial value to strong accelerators of great commercial value. A further object is to improve the vulcanization of rubber by employing therein new combinations of 2-mercapto-thiazoline accelerators with certain carboxylic acids which activate the accelerators to render them very active at normal vulcanizing temperatures while maintaining them sufficiently inactive at processing temperatures for commercial utilization. A still further object is to provide new combinations of accelerators and accelerator activators which will produce vulcanized rubber of improved properties. Other objects are to provide new compositions of matter and to advance the art. Still other objects will appear hereinafter.

The above and other objects may be accomplished in accordance with our invention, which comprises incorporating, in a rubber mix, a small proportion of a vulcanization accelerator of the class of 2-mercapto-thiazoline, C-alkyl 2-mercapto-thiazolines, C-hydroxyalkyl 2-mercapto-thiazolines and salts of such 2-mercapto-thiazolines and a small proportion of an activator for such accelerators which activator is selected from the class of unsubstituted aromatic monocarboxylic acids, unsubstituted aromatic dicarboxylic acids, sulfur-free aromatic monocarboxylic acids containing one non-hydrocarbon substituent and anhydrides of such acids, either with or without a small proportion of an unsubstituted aliphatic monocarboxylic acid of from 10 to 20 carbon atoms. We have found that the 2-mercapto-thiazoline accelerators act in the presence of such carboxylic acids and their anhydrides in a manner distinctly different from the thiazoles and other acidic accelerators. While such carboxylic acids retard the action of thiazoles and similar acidic accelerators, they have a tremendous activating effect on the 2-mercapto-thiazolines of our invention. In the absence of an acid, the 2-mercapto-thiazolines produce such poor cures that the resulting vulcanizates are of no industrial value. However, in the presence of an acid of our invention, the 2-mercapto-thiazoline accelerators give vulcanizates of high moduli and tensile strength which are extremely valuable commercially.

The 2-mercapto-thiazoline accelerators, which are to be employed in accordance with our invention, are 2-mercapto-thiazoline, the C-alkyl 2-mercapto-thiazolines, the C-hydroxyalkyl 2-mercapto-thiazolines and the salts thereof. The numbering of the 2-mercapto-thiazoline ring is as follows:

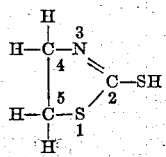

By the term "C-alkyl 2-mercapto-thiazolines," we mean 2-mercapto-thiazoline in which one or more of the hydrogen atoms in the 4 and 5 positions are substituted by alkyl groups. By the term "C-hydroxyalkyl 2-mercapto-thiazolines," we mean that one or more of the hydrogens in the 4 and 5 positions have been substituted by hydroxyalkyl groups and the other hydrogens in the 4 and 5 positions are either present or are substituted by 1 or more alkyl groups. By the term "alkyl," we mean an aliphatic hydrocarbon radical. By the term "hydroxyalkyl," we mean an aliphatic hydrocarbon radical in which one hydrogen has been replaced by a hydroxy group. Such 2-mercapto-thiazoline accelerators are activated by the carboxylic acids and combinations of carboxylic acids of our invention.

The aromatic carboxylic acids of our invention are the unsubstituted aromatic monocarboxylic acids, the unsubstituted aromatic dicarboxylic acids, the sulfur-free aromatic monocarboxylic acids containing one non-hydrocarbon substituent and anhydrides of such acids. When we refer to carboxylic acids herein and in the claims, we mean the free acids as distinguished from their salts, esters and the like. By the term "unsubstituted" monocarboxylic acids and dicarboxylic acids, we mean that such acids, except for the oxygen of the carboxyl groups, consist of carbon and hydrogen. By an aromatic acid, we mean that the carbon of the carboxyl, or COOH group, is directly bonded to a ring carbon atom of a benzene ring. When we refer to sulfur-free aromatic carboxylic acids "containing one non-hydrocarbon substituent," we mean that such acids, except for the oxygen of the carboxylic group, and, except for a single non-hydrocarbon substituent, consist of carbon and hydrogen. While this class of aromatic carboxylic acids are powerful activators for the 2-mercapto-thiazoline accelerators of our invention, we generally prefer the unsubstituted acids and particularly the unsubstituted aromatic monocarboxylic acids. Of the aromatic carboxylic acids of our invention, the following have been found to be particularly satisfactory for our purpose:

Benzoic acid

Phthalic acid

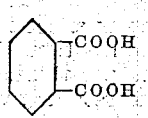

Benzoic anhydride

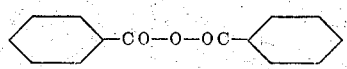

Cuminic acid

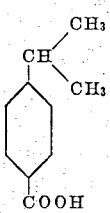

o-Toluic acid

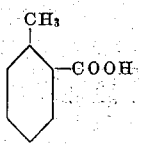

Beta-naphthoic acid

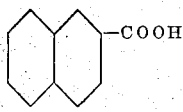

Para-anisic acid

Salicylic acid

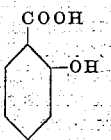

Alpha-naphthoic acid

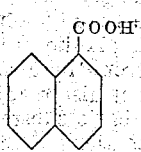

Phthalic anhydride

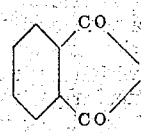

While the aromatic carboxylic acids of our invention may be employed alone as activators with satisfactory results, we have found that particularly desirable results are obtained when such aromatic carboxylic acids and their anhydrides are employed in combination with unsubstituted aliphatic monocarboxylic acids containing from 10 to 20 carbon atoms. We have found that, in the presence of such aliphatic acids, smaller amounts of the aromatic carboxylic acids may be employed to obtain a strong activating effect. By the term "unsubstituted" aliphatic monocarboxylic acids, we mean to include only those acids which, except for the oxygen of the carboxyl group, consist of carbon and hydrogen. Of such acids, we have found stearic acid and oleic acid to be particularly satisfactory.

The aromatic carboxylic acids and anhydrides of our invention will generally be employed in the proportion of from about 0.05 part to about 10 parts for each part of the 2-mercapto-thiazoline accelerator. We preferably employ from about 0.5 to about 3 parts of the aromatic acid or anhydride for each part of the accelerator. When an aliphatic acid of our invention is employed, it will generally be desirable to employ it in the proportion of from about 0.5 to about 10 parts for each part of the 2-mercapto-thiazoline accelerator, together with from about 0.05 to about 4 parts of aromatic acid or anhydride. Preferably, we employ from about 1 to about 5 parts of the aliphatic acid and from about 0.1 to about 2.5 parts of aromatic acid or anhydride for each part of 2-mercapto-thiazoline accelerator.

In order to illustrate the vast difference in cure, obtainable with 2-mercapto-thiazoline and 2-mercapto-benzothiazole in the absence of an acidic substance, the following stocks were prepared.

| Stock | A | B |
|---|---|---|
| Smoked sheets | 100 | 100 |
| Zinc oxide | 10 | 10 |
| Sulfur | 3 | 3 |
| 2-mercapto-thiazoline | 1 | |
| 2-mercaptobenzothiazole | | 1 |

Results of tests on these stocks appear in Table I.

Table I

| Min. cured | Temp. cured | Modulus at 600% elongation, lbs./sq. in. | | Tensile at break, lbs./sq. in. | |
|---|---|---|---|---|---|
| | | Stock A | Stock B | Stock A | Stock B |
| | °F. | | | | |
| 20 | 274 | 125 | 825 | 325 | 2,875 |
| 30 | 274 | 200 | 900 | 875 | 2,800 |
| 45 | 274 | 275 | 825 | 1,550 | 3,025 |
| 60 | 274 | 325 | 775 | 1,875 | 3,375 |

It can be seen, from these tests, that there is a marked difference in cure between stock A, containing 2-mercapto-thiazoline, and stock B, containing 2-mercapto-benzothiazole. The moduli and tensiles, produced by the 2-mercapto-thiazoline, are so low that the stock may be said to be very much undercured and is useless for commercial purposes. On the other hand, 2-mercapto-benzothiazole produces good moduli and tensiles and gives commercially important vulcanizates.

Since both of these accelerators, used in the above examples, are acidic accelerators, their great difference in behavior, when used in combination with an aromatic carboxylic acid or acid anhydride in accordance with our invention, is very surprising. 2-mercapto-benzothiazole is very much retarded, especially in the shorter cures, as is indicated by the prior art. 2-mercapto-thiazoline, on the other hand, is tremendously activated by the aromatic carboxylic acids of our invention, and is thereby transformed from an accelerator of no importance to one of the most desirable accelerators of vulcanization known today. It even exceeds 2-mercapto-benzothiazole in modulus and tensile characteristics, while retaining good processing safety. This ability to be so activated, with aromatic carboxylic acids and acid anhydrides, seems peculiar to 2-mercapto-thiazoline, its homologues and its derivatives, as all other acidic accelerators tested, such as 2-mercapto-benzothiazole, its salts and organic derivatives, and dithiocarbamic acids and their derivatives, were retarded and gave lower moduli and tensiles, at least in the shorter cures.

In order to illustrate the retarding action of aromatic carboxylic acids on 2-mercapto-benzothiazole, the following stocks were prepared:

| | Stock | | | |
|---|---|---|---|---|
| | B | C | D | E |
| Smoked sheets | 100 | 100 | 100 | 100 |
| Zinc oxide | 10 | 10 | 10 | 10 |
| Sulfur | 3 | 3 | 3 | 3 |
| 2-mercapto-benzothiazole | 1 | 1 | 1 | 1 |
| Benzoic acid | | 2 | | |
| Phthalic acid | | | 2 | |
| Benzoic anhydride | | | | 2 |

These stocks were vulcanized for periods of 20 and 30 minutes at 274° F. and then the modulus and tensile figures were determined. The results of these tests are presented in Table II.

Table II

| Min. cured | Temp. cured | Stock B | Stock C | Stock D | Stock E |
|---|---|---|---|---|---|
| | | Modulus at 600% elongation, lbs./sq. in. | | | |
| | °F. | | | | |
| 20 | 274 | 825 | 525 | 600 | 575 |
| 30 | 274 | 900 | 900 | 675 | 875 |
| | | Tensile at break, lbs./sq. in. | | | |
| 20 | 274 | 2,875 | 1,725 | 1,825 | 2,075 |
| 30 | 274 | 2,800 | 2,150 | 2,750 | 2,150 |

In Table II, it can be seen that all of the acids and anhydrides lowered the moduli and tensiles given by 2-mercapto-benzothiazole alone in stock B. Thus, while the prior art indicates that certain acidic substances increase the processing safety of stocks containing 2-mercapto-benzothiazole by retarding the cure at processing temperatures, it is plainly seen that this retardation of cure also takes place at higher vulcanizing temperature, where it is very undesirable.

This retardation of the rate of vulcanization by aromatic carboxylic acids and acid anhydrides is not confined to 2-mercapto-benzothiazole, but is also present when derivatives of 2-mercapto-benzothiazole are used, and even with other types of acidic accelerators such as dithiocarbamates and dithioacids. This is illustrated by the data given in Table III. The following stocks were tested:

| | Stock | | | | | | |
|---|---|---|---|---|---|---|---|
| | F | G | H | I | J | K | L |
| Smoked sheets | 100 | 100 | 100 | 100 | 100 | 100 | 100 |
| Zinc oxide | 10 | 10 | 10 | 10 | 10 | 10 | 10 |
| Sulfur | 3 | 3 | 3 | 3 | 3 | 3 | 3 |
| Benzoyl derivative of 2-mercapto-benzothiazole | 1 | 1 | 1 | | | | |
| Zinc salt of 2-mercapto-benzothiazole | | | | 1 | 1 | | |
| Zinc hexamethylene dithiocarbamate | | | | | | 0.2 | 0.2 |
| Benzoic acid | | 2 | | | 2 | | |
| Cuminic acid | | | 2 | | | | 0.3 |

Table III

| Min. cured | Temp. cured | Stock F | Stock G | Stock H | Stock I | Stock J | Stock K | Stock L |
|---|---|---|---|---|---|---|---|---|
| | °F. | \multicolumn{7}{l}{Modulus at 600% elongation, lbs./sq. in.} | | | | | | | |
| 20 | 274 | 725 | 300 | 350 | 600 | 325 | 975 | 825 |
| 30 | 274 | 800 | 625 | 625 | 725 | 700 | 825 | 800 |
| | | \multicolumn{7}{l}{Tensile at break, lbs./sq. in.} | | | | | | | |
| 20 | 274 | 2,475 | 1,875 | 1,850 | 2,125 | 1,725 | 3,600 | 3,000 |
| 30 | 274 | 2,950 | 2,725 | 3,075 | 2,350 | 2,675 | 2,900 | 2,900 |

This retardation of the cure, which results when aromatic carboxylic acids and acid anhydrides are employed with most acidic accelerators does not take place when 2-mercapto-thiazoline, a homologue or a derivative thereof, is employed as the accelerator. On the contrary, 2-mercapto-thiazoline, its homologues and derivatives, are greatly activated at ordinary curing temperatures by aromatic carboxylic acids and acid anhydrides employed in accordance with our invention. Thus a fast, high modulus cure, so desirable in the rubber industry, is produced. This activating effect is illustrated by tests carried out on the following stocks:

| | Stock A | Stock M | Stock N | Stock O | Stock P | Stock Q | Stock R |
|---|---|---|---|---|---|---|---|
| Smoked sheets | 100 | 100 | 100 | 100 | 100 | 100 | 100 |
| Zinc oxide | 10 | 10 | 10 | 10 | 10 | 10 | 10 |
| Sulfur | 3 | 3 | 3 | 3 | 3 | 3 | 3 |
| 2-mercapto-thiazoline | 1 | 0.85 | 0.85 | 0.85 | 0.85 | 0.85 | 0.85 |
| Benzoic acid | | 2 | | | | | |
| Ortho-toluic acid | | | 2 | | | | |
| Beta-naphthoic acid | | | | 2 | | | |
| Cuminic acid | | | | | 2 | | |
| Para-anisic acid | | | | | | 2 | |
| Benzoic anhydride | | | | | | | 2 |

These stocks were vulcanized and the modulus and tensile figures determined. These are given in Table IV.

Table IV

| Min. cured | Temp. cured | Stock A | Stock M | Stock N | Stock O | Stock P | Stock Q | Stock R |
|---|---|---|---|---|---|---|---|---|
| | °F. | \multicolumn{7}{l}{Modulus at 600% elongation, lbs./sq. in.} | | | | | | | |
| 60 | 227 | (¹) | 350 | 425 | 375 | 500 | 175 | 100 |
| 20 | 274 | 125 | 1,025 | 1,200 | 975 | 1,150 | 725 | 550 |
| 30 | 274 | 200 | 1,500 | 1,800 | 1,375 | 1,750 | 1,100 | 1,075 |
| 60 | 274 | 325 | 2,675 | 2,750 | 1,925 | 2,650 | 1,750 | 1,900 |
| 90 | 274 | 425 | 3,075 | 2,800 | 2,025 | 2,575 | 1,800 | 2,175 |
| | | \multicolumn{7}{l}{Tensile at break, lbs./sq. in.} | | | | | | | |
| 60 | 227 | (¹) | 800 | 1,725 | 875 | 1,775 | 400 | 450 |
| 20 | 274 | 325 | 2,725 | 3,050 | 2,975 | 3,575 | 1,975 | 1,850 |
| 30 | 274 | 875 | 3,450 | 3,550 | 3,300 | 3,575 | 2,800 | 3,400 |
| 60 | 274 | 1,875 | 3,750 | 4,100 | 3,700 | 4,175 | 2,975 | 4,050 |
| 90 | 274 | 2,125 | 4,475 | 3,925 | 3,450 | 4,125 | 3,225 | 4,300 |

¹ No cure.

Although a smaller amount of 2-mercapto-thiazoline was used in the stocks N to R than in stock A, the presence of the acids and anhydrides of our invention so activated it that the modulus and tensile figures were increased many times over those given by stock A. In fact, tensile figures of over 4000 lbs./sq. in. were produced. These activated stocks give very desirable cures, and are, at the same time quite safe at processing temperatures, as is indicated by the 60 minute cures at 227° F. It can be seen that, while a stock containing a 2-mercapto-thiazoline alone (stock A) is very much inferior to a stock containing 2-mercapto-benzothiazole (stock B), when the 2-mercapto-thiazoline stock is activated with an aromatic carboxylic acid or acid anhydride of our invention, it becomes vastly superior to the 2-mercapto-benzothiazole stock. This tremendous activation of an acidic accelerator of vulcanization by aromatic acids and acid anhydrides is entirely new and unexpected.

Not only are the aromatic carboxylic acids and acid anhydrides of our invention individually useful as activators for 2-mercapto-thiazoline accelerators, but they are also useful in combination with each other and with other organic acids, particularly the unsubstituted aliphatic monocarboxylic acids containing from 10 to 20 carbon atoms. Stearic acid, as well as other similar acids, derived from fats and oils, such as palmitic and oleic acids, have long been used as rubber compounding ingredients with neutral or basic accelerators. Russell, in U. S. Patent 1,467,197, claims beneficial action of these acids due to their ability to solubilize zinc oxide.

We have now found that very beneficial and entirely unexpected results are obtained when a small amount of an aromatic carboxylic acid or acid anhydride of our invention is added to a rubber stock, accelerated with a 2-mercapto-thiazoline and containing the amount of stearic acid usually employed with rubber accelerators. The activating effect, produced by the combination of acids, is not merely additive. The presence of even a small amount of an aromatic carboxylic acid or acid anhydride seems to exert a strong activating effect on the 2-mercapto-thiazoline in the presence of a long chain aliphatic monocarboxylic acid, such as stearic acid, that is entirely out of proportion to the amount of aromatic acid used. The addition of even 0.3 part of an aromatic acid or acid anhydride of our invention often increases the modulus of the stock as much as 60-70%. This remarkable activating effect is illustrated in Table V which gives the results of tests on the following rubber stocks.

In order to show that other aliphatic monocarboxylic acids, containing from 10 to 20 carbon atoms, are also operative according to our invention, stocks BB and CC were prepared in which oleic acid was used in place of stearic acid.

|  | Stock | |
|---|---|---|
|  | BB | CC |
| Smoked sheets | 100 | 100 |
| Zinc oxide | 10 | 10 |
| Sulfur | 3 | 3 |
| Oleic acid | 2 | 2 |
| 2-mercapto-thiazoline | 0.85 | 0.85 |
| Benzoic acid | | 0.3 |

|  | Stock | | | | | | | | |
|---|---|---|---|---|---|---|---|---|---|
|  | S | T | U | V | W | X | Y | Z | AA |
| Smoked sheets | 100 | 100 | 100 | 100 | 100 | 100 | 100 | 100 | 100 |
| Zinc oxide | 10 | 10 | 10 | 10 | 10 | 10 | 10 | 10 | 10 |
| Sulfur | 3 | 3 | 3 | 3 | 3 | 3 | 3 | 3 | 3 |
| Stearic acid | 2 | 2 | 2 | 2 | 2 | 2 | 2 | 2 | 2 |
| 2-mercapto-thiazoline | 0.85 | 0.85 | 0.85 | 0.85 | 0.85 | 0.85 | 0.85 | 0.85 | 0.85 |
| Benzoic acid | | 0.3 | | | | | | | |
| Ortho-toluic acid | | | 0.3 | | | | | | |
| Cuminic acid | | | | 0.3 | | | | | |
| Para-anisic acid | | | | | 0.3 | | | | |
| Beta-naphthoic acid | | | | | | 0.3 | | | |
| Alpha-naphthoic acid | | | | | | | 0.3 | | |
| Salicylic acid | | | | | | | | 0.3 | |
| Benzoic anhydride | | | | | | | | | 0.3 |

These stocks were cured for periods of 30, 60 and 90 minutes at 274° F. and the resulting vulcanizates tested with the following results.

*Table V*

| Min. cured | Temp. cured | Stock S | Stock T | Stock U | Stock V | Stock W | Stock X | Stock Y | Stock Z | Stock AA |
|---|---|---|---|---|---|---|---|---|---|---|
|  | °F. | Modulus at 600% elongation, lbs./sq. in. | | | | | | | | |
| 30 | 274 | 1,150 | 1,475 | 1,800 | 1,450 | 1,450 | 1,575 | 1,425 | 1,250 | 1,275 |
| 60 | 274 | 1,300 | 2,400 | 2,250 | 1,975 | 2,025 | 2,075 | 1,725 | 1,950 | 1,750 |
| 90 | 274 | 1,675 | 2,525 | 2,300 | 2,250 | 2,150 | 2,325 | 2,125 | 2,350 | 2,025 |
|  |  | Tensile at break, lbs./sq. in. | | | | | | | | |
| 30 | 274 | 3,400 | 3,825 | 3,925 | 4,475 | 4,250 | 4,225 | 3,875 | 3,725 | 4,050 |
| 60 | 274 | 3,900 | 4,125 | 3,900 | 4,425 | 3,750 | 3,700 | 4,725 | 4,175 | 4,050 |
| 90 | 274 | 4,125 | 4,025 | 4,075 | 4,300 | 3,675 | 3,900 | 3,900 | 3,750 | 3,650 |

It can be seen from these results that even very small amounts of the aromatic carboxylic acids and acid anhydrides of our invention considerably increased the moduli of the stocks. This is very remarkable since increasing the stearic acid content of stock S from 2% to 3% gives only about a 5% to 10% increase in modulus. This is shown by the following results in which the 600% modulus of stock S is compared with the 600% modulus of a similar stock, stock $S_1$, containing 3% of stearic acid.

|  | Stock S | Stock $S_1$ |
|---|---|---|
| 20 min. at 274° F | 750 | 775 |
| 30 min. at 274° F | 1,150 | 1,200 |
| 60 min. at 274° F | 1,300 | 1,525 |
| 90 min. at 274° F | 1,675 | 1,875 |

This activation of 2-mercapto-thiazoline by small amounts of aromatic acids and anhydrides, in the presence of stearic acid or other similar acid, is also present in the shorter cures. The activation at processing temperatures is slight, however, and the stocks retain their processing safety.

Test results on these stocks are presented in Table VI.

*Table VI*

| Min. cured | Temp. cured | Modulus at 600% elongation lbs./sq. in. | | Tensile at break, lbs./sq. in. | |
|---|---|---|---|---|---|
|  |  | Stock BB | Stock CC | Stock BB | Stock CC |
|  | °F. | | | | |
| 60 | 227 | 225 | 250 | 1,300 | 1,350 |
| 20 | 274 | 575 | 675 | 2,575 | 2,400 |
| 30 | 274 | 875 | 1,050 | 3,375 | 2,875 |
| 60 | 274 | 1,325 | 1,650 | 3,675 | 4,025 |
| 90 | 274 | 1,425 | 1,800 | 3,775 | 4,100 |

Activation occurs on even the short cures at 274° F., but practically no activation is apparent at 227° F., so the stock retain processing safety.

This type of activation of a 2-mercapto-thiazoline, by an aromatic carboxylic acid or acid anhydride in the presence of stearic acid, also manifests itself in a rubber stock containing carbon black. This is illustrated in Table VII.

|  | Stock | |
|---|---|---|
|  | DD | EE |
| Smoked sheets | 100 | 100 |
| Zinc oxide | 10 | 10 |
| Channel black | 25 | 25 |
| Sulfur | 3 | 3 |
| Stearic acid | 2 | 2 |
| 2-mercapto-thiazoline | 0.85 | 0.85 |
| Benzoic acid | ------ | 0.3 |

Table VII

| Min. cured | Temp. cured | Modulus at 600% elongation, lbs./sq. in. | | Tensile at break, lbs./sq. in. | |
|---|---|---|---|---|---|
|  |  | Stock DD | Stock EE | Stock DD | Stock EE |
|  | °F. |  |  |  |  |
| 60 | 227 | 1,125 | 1,150 | 1,400 | 1,225 |
| 20 | 274 | 2,225 | 2,350 | 3,325 | 3,550 |
| 30 | 274 | 3,000 | 3,225 | 4,525 | 4,550 |
| 60 | 274 | 3,775 | 4,150 | 4,925 | 4,850 |
| 90 | 274 | 4,000 | 4,300 | 4,600 | 4,600 |

The use of aromatic acids increases the modulus throughout the range of cure without impairing the processing safety.

Not only is 2-mercapto-thiazoline activated by a small amount of an aromatic acid or acid anhydride in the presence of an acid such as stearic acid, but its homologues and derivatives are likewise activated. To illustrate this fact, the following stocks were prepared:

|  | Stock | | | |
|---|---|---|---|---|
|  | FF | GG | HH | II |
| Smoked sheets | 100 | 100 | 100 | 100 |
| Zinc oxide | 10 | 10 | 10 | 10 |
| Stearic acid | 2 | 2 | 2 | 2 |
| Sulfur | 3 | 3 | 3 | 3 |
| 4-methyl-2-mercaptothiazoline | 0.85 | 0.85 |  |  |
| Zinc salt of 2-mercaptothiazoline |  |  | 0.85 | 0.85 |
| Benzoic acid |  | 0.3 |  | 0.3 |

Results of tests on the stocks are given in Table VIII.

Table VIII

| Min. cured | Temp. cured | Modulus at 600% elongation, lbs./sq. in. | | Modulus at 700% elongation, lbs./sq. in. | |
|---|---|---|---|---|---|
|  |  | Stock FF | Stock GG | Stock HH | Stock II |
|  | °F. |  |  |  |  |
| 30 | 274 | 1,075 | 1,300 | 1,575 | 1,825 |
| 60 | 274 | 1,725 | 2,000 | 2,350 | 2,725 |
| 90 | 274 | 1,750 | 2,175 | 2,775 | 3,150 |

It has been shown that 2-mercapto-thiazolines are activated by small amounts of an aromatic carboxylic acid or acid anhydride in the presence of an aliphatic monocarboxylic acid containing from 10 to 20 carbon atoms. Other acidic accelerators, however, such as 2-mercapto-benzothiazole, are not activated by a similar combination of acids, but are usually retarded instead. The following tests show the retarding action of these acid combinations on 2-mercapto-benzothiazole in both gum type stocks and stocks containing carbon black.

|  | Stock | | | | | |
|---|---|---|---|---|---|---|
|  | JJ | KK | LL | MM | NN | OO |
| Smoked sheets | 100 | 100 | 100 | 100 | 100 | 100 |
| Channel black | 25 | 25 |  |  |  |  |
| Zinc oxide | 10 | 10 | 10 | 10 | 10 | 10 |
| Stearic acid | 3 | 3 | 2 | 2 | 2 | 2 |
| Sulfur | 3 | 3 | 3 | 3 | 3 | 3 |
| 2-mercapto-benzothiazole | 1 |  | 0.85 | 0.85 | 0.85 | 0.85 |
| Phthalic anhydride |  | 0.2 |  |  |  |  |
| Benzoic anhydride |  |  |  | 0.3 |  |  |
| Cuminic acid |  |  |  |  | 0.3 |  |
| Ortho-toluic acid |  |  |  |  |  | 0.3 |

Table IX

| Min. cured | Temp. cured | Stock JJ | Stock KK | Stock LL | Stock MM | Stock NN | Stock OO |
|---|---|---|---|---|---|---|---|
|  |  | Modulus at 600% elongation, lbs./sq. in. | | | | | |
|  | °F. |  |  |  |  |  |  |
| 20 | 274 | 2,375 | 1,800 | 975 | 725 | 875 | 800 |
| 30 | 274 | 2,875 | 2,450 | 1,175 | 1,025 | 1,175 | 1,050 |
| 45 | 274 | 3,575 | 3,125 |  |  |  |  |

This retarding effect takes place, not only with mercapto-thiazoles, but also with other types of acidic accelerators such as dithiocarbamates. The following test on the zinc salt of hexamethylene dithiocarbamic acid illustrates this.

|  | Stock | |
|---|---|---|
|  | PP | QQ |
| Smoked sheets | 100 | 100 |
| Zinc oxide | 10 | 10 |
| Stearic acid | 2 | 2 |
| Sulfur | 3 | 3 |
| Zinc hexamethylene dithiocarbamate | 0.2 | 0.2 |
| Cuminic acid |  | 0.3 |

These two stocks were vulcanized for periods of 20 and 30 minutes at 274° F. and the modulus figures then determined. The modulus at 600% elongation in lbs./sq. in. was as follows:

Table X

| Min. cured | Stock PP | Stock QQ |
|---|---|---|
| 20 | 1,225 | 1,075 |
| 30 | 1,350 | 1,125 |

It can be seen, from the tests given above, that 2-mercapto-thiazolines are unique in that they are greatly activated by aromatic acids and anhydrides of our invention, both alone and in the presence of an unsubstituted aliphatic monocarboxylic acid of from 10 to 20 carbon atoms. This activation is very important in that it permits the compounding of stocks that are very desirable commercially. These stocks give a fast, high modulus cure, and at the same time process without difficulty.

Not only do the vulcanizates, prepared according to our invention, possess excellent modulus and tensile properties, but they also possess other very desirable physical properties. Many stocks, containing an accelerator activated by another substance, suffer deterioration of physical properties due to the activation. This is not true of the vulcanizates of our invention. Their resistance toward aging, for example is excellent. The following stocks were prepared, then aged in the oxygen bomb for 14 days at 70° C. at 300 lbs. oxygen pressure. The tensile figures were then determined. These are presented in Table XI.

|  | Stock | |
|---|---|---|
|  | RR | SS |
| Smoked sheets | 100 | 100 |
| Zinc oxide | 10 | 10 |
| Stearic acid | 2 | 2 |
| Sulfur | 3 | 3 |
| Phenyl-beta-naphthylamine | 1 | 1 |
| 2-mercapto-thiazoline | 0.85 | 0.85 |
| Salicylic acid | 0.5 |  |
| Benzoic acid |  | 0.5 |

*Table XI*

| Min. cured | Temp. cured | Stock RR | | Stock SS | |
|---|---|---|---|---|---|
|  |  | Original tensile | Tensile after aging | Original tensile | Tensile after aging |
|  | °F. |  |  |  |  |
| 45 | 274 | 3,950 | 3,875 | 4,475 | 2,950 |
| 60 | 274 | 4,550 | 3,025 | 4,650 | 3,275 |

Vulcanizates, prepared according to our invention, also possess excellent resistance toward deterioration by heat, tearing, abrasion and flex-cracking.

The foregoing test formulae are given for illustrative purposes only. Many changes and variations within our invention will be readily apparent to those skilled in the art. Various compounding ingredients and fillers, other than those hereinbefore disclosed, may be employed and in varying proportions. Also, other 2-mercapto-thiazoline accelerators may be employed in place of those hereinbefore disclosed. Some of such other 2-mercapto-thiazoline accelerators are as follows:

4-ethyl-2-mercapto-thiazoline
4-propyl-2-mercapto-thiazoline
4,4-dimethyl-2-mercapto-thiazoline
5,5-dimethyl-2-mercapto-thiazoline
4-methyl-4-ethyl-2-mercapto-thiazoline
4-methyl-5-propyl-2-mercapto-thiazoline
4-isopropyl-5-propyl-2-mercapto-thiazoline
4-ethyl-5-propyl-2-mercapto-thiazoline
4-methyl-5-hydroxy-methyl-2-mercapto-thiazoline
4-methyl-4-ethyl-5-propyl-2-mercapto-thiazoline
4-ethyl-5-methyl-2-mercapto-thiazoline
4-propyl-5-propyl-2-mercapto-thiazoline
4,5-dimethyl-2-mercapto-thiazoline
4-hydroxy-ethyl-2-mercapto-thiazoline
4,4,5,5-tetramethyl-2-mercapto-thiazoline
Lead salt of 2-mercapto-thiazoline
Cadmium salt of 2-mercapto-thiazoline
Iron salt of 2-mercapto-thiazoline
Zinc salt of 4-methyl-2-mercapto-thiazoline
Cadmium salt of 4-methyl-2-mercapto-thiazoline
Zinc salt of 4-ethyl-2-mercapto-thiazoline
Lead salt of 5-propyl-2-mercapto-thiazoline
Cadmium salt of 4,4-dimethyl-2-mercapto-thiazoline
Iron salt of 5,5-dimethyl-2-mercapto-thiazoline
Zinc salt of 4-methyl-4-ethyl-2-mercapto-thiazoline
Cadmium salt of 4,4-dimethyl-5-propyl-2-mercapto-thiazoline
Zinc salt of 4-hydroxy-methyl-2-mercapto-thiazoline
Zinc salt of 4,4,5,5-tetra-methyl-2-mercapto-thiazoline Aromatic carboxylic acids, other than those hereinbefore specifically disclosed, may be employed in accordance with our invention. Representative of such other aromatic carboxylic acids are:

Meta-toluic acid
Para-toluic acid
Ethyl-benzoic acid
Propyl-benzoic acid
Butyl-benzoic acid
Cetyl-benzoic acid
Dimethyl-benzoic acid
Diethyl-benzoic acid
Benzyl-benzoic acid
Methyl-ethyl-benzoic acid
Phenyl-benzoic acid
Methyl-phenyl-benzoic acid
Alpha-methyl-beta-naphthoic acid
Anthracene carboxylic acid
Ortho-toluic anhydride
Cuminic anhydride
Terephthalic acid
Chlorobenzoic acid
Aminobenzoic acid
2-hydroxy-4-methyl-benzoic acid
2-ethyl-4-methoxy-benzoic acid
4-methyl-phthalic acid
2-chloro-4-isopropyl-benzoic acid
2-methyl-4-amino-benzoic acid
Alpha-hydroxy-beta-naphthoic acid
Para-carboxy-acetophenone
Para-carbethoxy-benzoic acid
Beta-ethoxy-alpha-naphthoic acid
Para-anisic acid anhydride
Ortho-chloro benzoic acid anhydride Also, unsubstituted aliphatic monocarboxylic acids of 10 to 20 carbon atoms, other than those hereinbefore specifically disclosed, may be employed in the combinations of our invention. Representative of such other aliphatic acids are:

Palmitic acid          Lauric acid
Linoleic acid          Myristic acid
Margaric acid It will also be apparent that mixtures of two or more 2-mercapto-thiazolines may be employed as the accelerator. Mixtures of two or more aromatic carboxylic acids of our invention may be employed as activators. Furthermore, mixtures of two or more aliphatic carboxylic acids of our invention may be employed.

It will be apparent that by our invention, we have converted 2-mercapto-thiazolines from weak accelerators of no commercial value to extremely active accelerators of very great commercial value. This has been done without rendering the accelerators so active at the lower processing temperatures as to make them unsafe for commercial utilization. By the combinations of our invention, fast, high modulus cures are obtained, with no reversion, and with great processing safety. The resulting vulcanizates have exceedingly good resistance toward tear, abrasion and flex-cracking, as well as excellent resistance toward deterioration by heat or oxidation. We have rendered the 2-mercapto-thiazoline accelerators at least as active as 2-mercaptobenzothiazole at the normal vulcanizing temperatures and, at the same time, have obtained products having better properties, particularly as to reversion, processing safety, resistance toward deterioration and the like.

We claim:

1. Rubber, having incorporated therein prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of an unsubstituted aliphatic monocarboxylic acid of from 10 to 20 carbon atoms and a small proportion of an activator of the group consisting of unsubstituted aromatic monocarboxylic acids, unsubstituted aromatic dicarboxylic acids, sulfur-free aromatic monocarboxylic acids containing one non-hydrocarbon substituent, and anhydrides of such acids.

2. Rubber, having incorporated therein prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of an unsubstituted aliphatic monocarboxylic acid of from 10 to 20 carbon atoms and a small proportion of an aromatic carboxylic acid which, except for from 1 to 2 carboxyl groups, consists of carbon and hydrogen.

3. Rubber, having incorporated therein prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of an unsubstituted aliphatic monocarboxylic acid of from 10 to 20 carbon atoms and a small proportion of a sulfur-free aromatic monocarboxylic acid of the benzene series which contains not more than 1 non-hydrocarbon group other than the carboxyl group.

4. Rubber, having incorporated therein prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of stearic acid and a small proportion of an activator of the group consisting of unsubstituted aromatic monocarboxylic acids, unsubstituted aromatic dicarboxylic acids, sulfur-free aromatic monocarboxylic acids containing one non-hydrocarbon substituent, and anhydrides of such acids.

5. Rubber, having incorporated therein prior to vulcanization, a small proportion of 2-mercapto-thiazoline, and a small proportion of an unsubstituted aliphatic monocarboxylic acid of from 10 to 20 carbon atoms and a small proportion of an activator of the group consisting of unsubstituted aromatic monocarboxylic acids, unsubstituted aromatic dicarboxylic acids, sulfur-free aromatic monocarboxylic acids containing one non-hydrocarbon substituent, and anhydrides of such acids.

6. Rubber, having incorporated therein prior to vulcanization, a small proportion of 2-mercapto-thiazoline, and a small proportion of stearic acid and a small proportion of a sulfur-free aromatic carboxylic acid which contains a total of from 1 to 2 carboxyl groups and not more than 1 other non-hydrocarbon group and in which the sum of the carboxyl groups and non-hydrocarbon groups is from 1 to 2.

7. Rubber, having incorporated therein prior to vulcanization, a small proportion of 2-mercapto-thiazoline, and a small proportion of stearic acid and a small proportion of benzoic acid.

8. The method of vulcanizing rubber which comprises incorporating into a vulcanizable rubber mix, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals and a small proportion of an unsubstituted aliphatic monocarboxylic acid of from 10 to 20 carbon atoms and a small proportion of an activator of the group consisting of unsubstituted aromatic monocarboxylic acids, unsubstituted aromatic dicarboxylic acids, sulfur-free aromatic monocarboxylic acids containing one non-hydrocarbon substituent, and anhydrides of such acids, and then subjecting the rubber mix to vulcanizing conditions.

9. The method of vulcanizing rubber which comprises incorporating, into a vulcanizable rubber mix, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals and a small proportion of an unsubstituted aliphatic monocarboxylic acid of from 10 to 20 carbon atoms and a small proportion of an aromatic carboxylic acid which, except for from 1 to 2 carboxyl groups, consists of carbon and hydrogen, and then subjecting the rubber mix to vulcanizing conditions.

10. The method of vulcanizing rubber which comprises incorporating into a vulcanizable rubber mix, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of an unsubstituted aliphatic monocarboxylic acid of from 10 to 20 carbon atoms, and a small proportion of a sulfur-free aromatic monocarboxylic acid of the benzene series which contains not more than 1 non-hydrocarbon group other than the carboxyl group, and then subjecting the rubber mix to vulcanizing conditions.

11. The method of vulcanizing rubber which comprises incorporating into a vulcanizable rubber mix, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, and a small proportion of stearic acid and a small proportion of an activator of the group consisting of unsubstituted aromatic monocarboxylic acids, unsubstituted aromatic dicarboxylic acids, sulfur-free aromatic monocarboxylic acids containing one non-hydrocarbon substituent, and anhydrides of such acids, and then subjecting the rubber mix to vulcanizing conditions.

12. Rubber, having incorporated therein prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, a small proportion of an unsubstituted aliphatic monocarboxylic acid of from 10 to 20 carbon atoms and a small proportion of a sulfur-free aromatic monocarboxylic acid containing not more than one non-hydrocarbon group other than the carboxyl group.

13. Rubber, having incorporated therein prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, a small proportion of an unsubstituted aliphatic monocarboxylic acid of from 10 to 20 carbon atoms and a small proportion of an aromatic monocarboxylic acid which, except for the carboxyl group, consists of carbon and hydrogen.

14. Rubber, having incorporated therein prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, a small proportion of an unsubstituted aliphatic monocarboxylic acid of from 10 to 20 carbon atoms and a small proportion of an aromatic monocarboxylic acid of the benzene series which, except for the carboxyl group, consists of carbon and hydrogen.

15. Rubber, having incorporated therein prior to vulcanization, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, a small proportion of an unsubstituted aliphatic monocarboxylic acid of from 10 to 20 carbon atoms and a small proportion of benzoic acid.

16. Rubber, having incorporated therein prior to vulcanization, a small proportion of 2-mercapto-thiazoline, a small proportion of an unsubstituted aliphatic monocarboxylic acid of from 10 to 20 carbon atoms and a small proportion of an aromatic carboxylic acid which, except for from 1 to 2 carboxyl groups, consists of carbon and hydrogen.

17. Rubber, having incorporated therein prior to vulcanization, a small proportion of 2-mercapto-thiazoline, a small proportion of an unsubstituted aliphatic monocarboxylic acid of from 10 to 20 carbon atoms and a small proportion of a sulfur-free aromatic monocarboxylic acid of the benzene series which contains not more than 1 non-hydrocarbon group other than the carboxyl group.

18. Rubber, having incorporated therein prior to vulcanization, a small proportion of 2-mercapto-thiazoline, a small proportion of an unsubstituted aliphatic monocarboxylic acid of from 10 to 20 carbon atoms and a small proportion of benzoic acid.

19. The method of vulcanizing rubber which comprises incorporating, into a vulcanizable rubber mix, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, a small proportion of an unsubstituted aliphatic monocarboxylic acid of from 10 to 20 carbon atoms and a small proportion of an aromatic monocarboxylic acid which, except for the carboxyl group, consists of carbon and hydrogen, and then subjecting the rubber mix to vulcanizing conditions.

20. The method of vulcanizing rubber which comprises incorporating, into a vulcanizable rubber mix, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, a small proportion of an unsubstituted aliphatic monocarboxylic acid of from 20 to 20 carbon atoms and a small proportion of an aromatic monocarboxylic acid of the benzene series which, except for the carboxyl group, consists of carbon and hydrogen, and then subjecting the rubber mix to vulcanizing conditions.

21. The method of vulcanizing rubber which comprises incorporating, into a vulcanizable rubber mix, a small proportion of a vulcanization accelerator of the group consisting of 2-mercapto-thiazoline, C-alkyl 2-mercapto-thiazolines, C-hydroxyalkyl 2-mercapto-thiazolines and metal salts of such 2-mercapto-thiazolines in which all of the valences of the metals are satisfied by 2-thio-thiazoline radicals, a small proportion of an unsubstituted aliphatic monocarboxylic acid of from 10 to 20 carbon atoms and a small proportion of benzoic acid, and then subjecting the rubber mix to vulcanizing conditions.

22. Rubber, having incorporated therein prior to vulcanization, a small proportion of 2-mercapto-thiazoline, a small proportion of stearic acid and a small proportion of salicylic acid.

ARTHUR M. NEAL.
BERNARD M. STURGIS.